Figure 1:
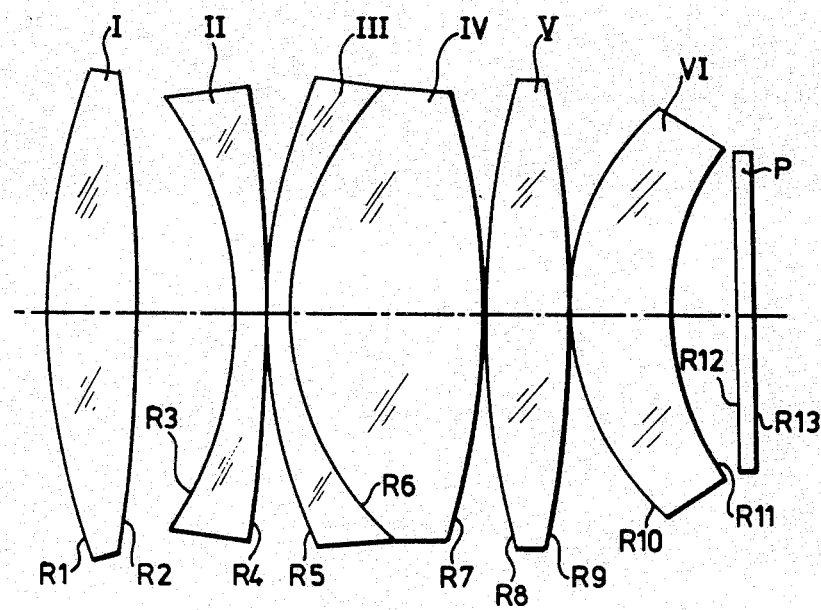

United States Patent

Rogers et al.

[11] 4,183,624
[45] Jan. 15, 1980

[54] LENSES

[75] Inventors: Philip J. Rogers, Meliden; Michael Roberts, Abergele, both of Wales

[73] Assignee: Pilkington P. E. Limited, St. Helens, England

[21] Appl. No.: 747,516

[22] Filed: Dec. 6, 1976

[30] Foreign Application Priority Data

Dec. 18, 1975 [GB] United Kingdom ............... 51923/75

[51] Int. Cl.² ............................................... G02B 9/60
[52] U.S. Cl. ............................... 350/175 E; 350/176; 350/216
[58] Field of Search ............. 350/175 E, 176, 216, 350/225, 229

[56] References Cited

U.S. PATENT DOCUMENTS

| 2,416,442 | 2/1947 | Grey | 350/229 X |
| 2,549,158 | 4/1951 | Bertele | 350/175 E |
| 2,862,418 | 12/1958 | Lowenthal | 350/216 |
| 3,384,434 | 5/1968 | Scidmore et al. | 350/175 E |
| 3,623,791 | 11/1971 | Vetake | 350/175 E X |
| 3,823,999 | 7/1974 | Versteeg | 350/175 E |
| 3,922,072 | 11/1975 | Rogers | 350/175 E |

*Primary Examiner*—Paul A. Sacher
*Attorney, Agent, or Firm*—Mattern, Ware, Davis & Stoltz

[57] ABSTRACT

A biocular magnifying lens suitable for use as an eyepiece in a night vision device comprises from front to back a positive element which is bi-convex or meniscus convex towards the front, a negative meniscus element concave towards the front, a positive singlet or doublet element which is convex towards the front, a positive element which is bi-convex or meniscus convex towards the front, and a positive meniscus element convex towards the front.

15 Claims, 3 Drawing Figures

LENSES

This invention concerns improvements in or relating to lenses and relates more particularly to biocular magnifying lenses suitable for use, for example, as eye-pieces in night vision devices.

In U.S. Pat. No. 3,922,072 there is disclosed a biocular magnifying lens having a front part, a middle part and a back part, the front part being convergent within specified focal length limits.

It is an object of the present invention to provide a biocular magnifying lens wherein the front part can be convergent, neutral, or divergent.

According to the present invention there is provided a biocular magnifying lens faster than F/1.0 having a front part, a middle part, and a back part, the front part comprising at least two elements including a positive element disposed in front of a negative element, which negative element has a concave front surface, the middle part being convergent, and the back part being convergent and comprising at least two elements including a positive element disposed in front of a rear positive element, said rear positive element being meniscus in shape convex towards the front and having a divergent rear surface. In such a lens the front part, which may be convergent, neutral, or divergent, acts primarily to correct spherical aberration, said concave front surface of the negative element in the front part serving in particular to correct spherical aberration introduced by convergent elements in the lens. Said concave front surface of the negative element in the front part may also assist in minimising longitudinal chromatic aberration. The middle part of the lens provides a substantial proportion of the power of the complete lens and may also be arranged to assist in minimising longitudinal chromatic aberration. The back part of the lens minimises geometric distortion and may also assist in the achievement of a relatively large angular field of view.

The front part of the lens may consist of a positive element disposed in front of a negative meniscus element concave towards the front, the positive element preferably being bi-convex.

The middle part of the lens may consist of a single positive element or may consist of a positive element and a negative element which are preferably formed into a cemented doublet. The negative element may be a meniscus element and the positive element may be a bi-convex element. The two elements are preferably of different glasses, for example the negative element may be of flint glass while the positive element is of crown glass. For example, the middle part may consist of a negative meniscus element convex towards the front and of flint glass whose rear concave surface is cemented to the front convex surface of a bi-convex element of crown glass.

The back part of the lens may consist of a positive bi-convex element disposed in front of a positive meniscus element convex towards the front. The divergent back surface of the meniscus element may achieve partial field curvature correction.

In the complete lens astigmatism is controlled by the effective spacing between the middle and back parts and the action of the front surface of the rear element in the back part, and the parts are arranged to effect coma correction.

The front part of the lens may have a focal length in the range 2.5F through infinity to −6F (and preferably in the range 2.5F through infinity to −20F), the middle part a focal length in the range 1.7F to 4.0F, and the back part a focal length in the range 1.1F to 2.0F, where F is the focal length of the complete lens. Particular more limited ranges within which the focal lengths may fall are as follows. The front part may have a focal length in the range 7.63F through infinity to −92.30F, the middle part a focal length in the range 2.02F to 2.22F, and the back part a focal length in the range 1.36F to 1.38F.

The front part may consist of a positive element of focal length in the range 1.75F to 4.5F (and possibly in the range 2.35F to 2.68F) disposed in front of a negative element of focal length in the range −1.9F to infinity (and possibly in the range −2.20F to −2.79F). The back part may consist of a positive element of focal length in the range 2.0F to 4.0F (and possibly in the range 2.24F to 2.36F) disposed in front of a positive meniscus element of focal length in the range 3.3F to 100F (and possibly in the range 4.05F to 4.22F).

The invention further provides a biocular magnifying lens faster than F/1.0 consisting of from front to back a positive element which is bi-convex or meniscus convex towards the front, a negative meniscus element concave towards the front, a positive singlet or doublet element which is convex towards the front, a positive element which is bi-convex or meniscus convex towards the front, and a positive meniscus element convex towards the front.

Figure 2:
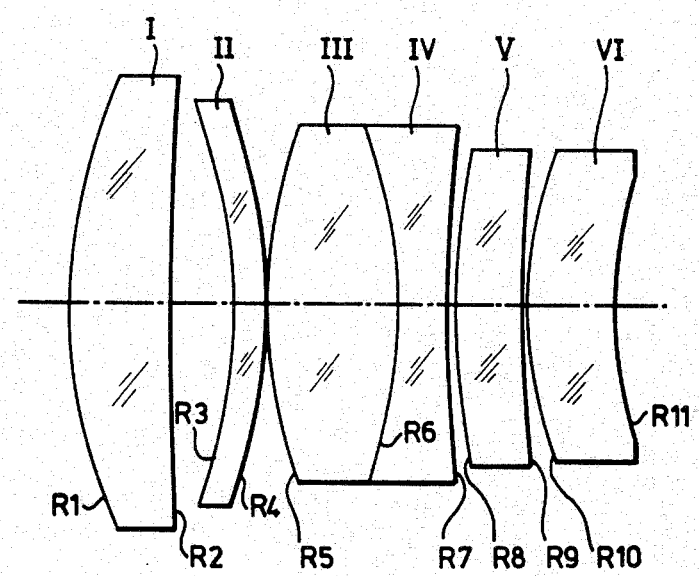
Figure 3:
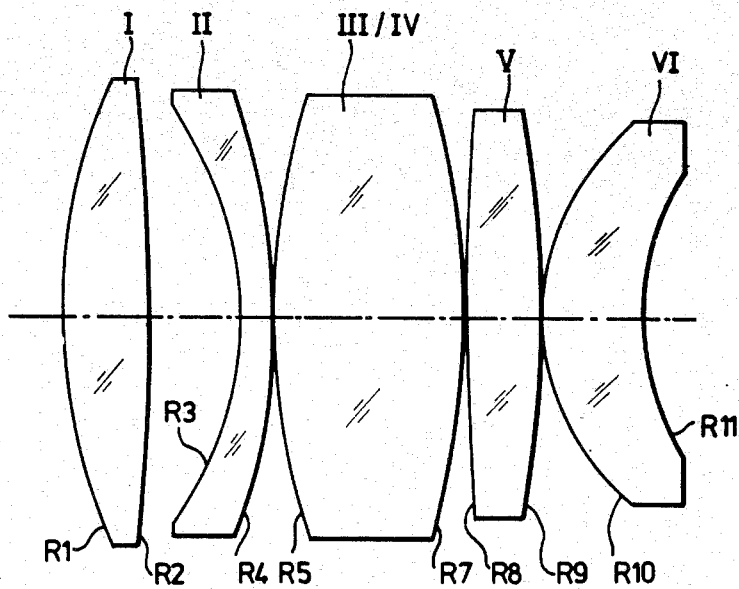

Embodiments of lens in accordance with the invention will now be described, by way of example, with reference to the accompanying schematic drawings in which:

FIG. 1 shows a first embodiment,
FIG. 2 shows a second embodiment, and
FIG. 3 shows a third embodiment.

The biocular magnifying lens shown in FIG. 1 comprises from front to back, i.e. from left to right as viewed in the drawing, elements I to VI.

Elements I and II form the front part of the lens which front part as a whole may be convergent, or neutral, or divergent and which may for example have a focal length in the range 2.5F through infinity to −6F but preferably to −20F where F is the focal length of the complete lens. The element I is a positive element which is preferably bi-convex but may be meniscus convex towards the front and which may for example have a focal length between 1.75F and 4.5F. The element II is a negative meniscus element concave towards the front and may for example have a focal length between −1.9F and infinity. The primary function of the front part of the lens is to correct spherical aberration and, in particular, the divergent front surface of the element II achieves the majority of the correction of spherical aberration introduced by the convergent elements of the lens and also assists in minimising longitudinal chromatic aberration.

The elements III and IV provide the middle part of the lens which middle part as a whole is convergent and provides a substantial proportion of the power of the complete lens. For example, the middle part as a whole may have a focal length between 1.7F and 4.0F. The element III is a negative meniscus element convex towards the front while the element IV is a positive bi-convex element. The element III is of flint glass and its rear concave surface is cemented to the front convex surface of the element IV, which is of crown glass, to form a cemented doublet. This doublet configuration provides longitudinal chromatic correction, i.e. the surface of contact between the elements III and IV assists in conjunction with the action of the front divergent surface of the element II in minimising longitudinal chromatic aberration in the complete lens.

It will be appreciated that, if desired, the doublet formed by elements III and IV could be reversed, i.e. the middle part of the lens could comprise a positive bi-convex element of crown glass disposed in front of and cemented to a negative meniscus element, concave towards the front, or a bi-concave element of flint glass.

It will further be appreciated that if the middle part of the lens is not required to provide longitudinal chromatic correction, (e.g. if in particular circumstances longitudinal chromatic aberration is not of concern) then the middle part of the lens could be a single positive element providing the required power instead of a doublet as described above.

The elements V and VI form the back part of the lens, which minimises geometric distortion. The back part as a whole may for example have a focal length between 1.1F and 2.0F. The element V is a positive bi-convex element, which may for example have a focal length between 2.0F and 4.0F. The element VI is a positive meniscus element convex towards the front which may for example have a focal length between 3.3F and 100F. Relatively high index glass types are preferably used for the elements V and VI. For example the element V may be of a glass having a refractive index Nd between 1.6 and 1.86, and the element VI may be of a glass having a refractive index Nd between 1.6 and 1.96. The rear element VI is highly meniscus with a highly divergent rear surface, for example the radius of curvature of the rear surface may be in the range 0.83F to 1.5F, and the ratio of the radius of curvature of the front surface to that of the rear surface may be in the range 0.5 to 1.4. With such configuration a relatively low Petzval sum can be achieved, and hence a relatively low field curvature. Although this may tend to increase astigmatism (which is essentially controlled by the effective separation between the back convex surface of the element IV and the front convex surface of the element VI), a satisfactory compromise can normally be achieved between field curvature reduction and an acceptable amount of astigmatism in the edge of field region of view (i.e. the region of monocular viewing). Geometric distortion is minimised by the distribution of power amongst the surfaces of the elements V and VI, and this enables a relatively large angle of field of view to be achieved, for example a field of view about 60 degrees over a 50 mm object format.

FIG. 1 also shows a window or glass plate P having planar surfaces and which may be the face plate of a cathode ray tube whose screen is viewed through the lens. In this case the design wave band of the lens is chosen to allow for a satisfactory combination of the emission wave band of the phosphor of the cathode ray tube and photopic eye characteristics. Particular specific examples of lenses according to the above described embodiment are as follows, the surface of the elements being indicated from front to back as R1 to R13. The dimensional units in the following examples are millimeters but, as will be well understood by those skilled in the art, the values are relative and can therefore be scaled accordingly.

EXAMPLE 1

| Element | Surface | Radius of Curvature | Axial Thickness/ Separation | Refractive Index Nd | Constringence V |
|---|---|---|---|---|---|
| I | R1 | 115.95 | | | |
| | | | 14.41 | 1.6204 | 60.3 |
| | R2 | −256.57 | | | |
| | | | 14.20 | | |
| | R3 | −58.28 | | | |
| II | | | 4.81 | 1.6535 | 33.5 |
| | R4 | −349.66 | | | |
| | | | 0.24 | | |
| | R5 | 95.12 | | | |
| III | | | 3.75 | 1.7484 | 27.7 |
| | R6 | 47.24 | | | |
| IV | | | 31.14 | 1.6204 | 60.3 |
| | R7 | −112.37 | | | |
| | | | 0.24 | | |
| | R8 | 148.34 | | | |
| V | | | 14.60 | 1.7440 | 44.8 |
| | R9 | −195.81 | | | |
| | | | 0.24 | | |
| | R10 | 41.94 | | | |
| VI | | | 16.61 | 1.8503 | 32.2 |
| | R11 | 45.31 | | | |
| | | | 9.85 | | |
| | R12 | PLANO | | | |
| P | | | 3.47 | 1.6204 | 60.3 |
| | R13 | PLANO | | | |

EFL 49.37  F/0.61  60 Degrees Field of View

FOCAL LENGTH RATIOS:

| I | II | III | IV | V | VI |
|---|---|---|---|---|---|
| 2.67F | −2.20F | −2.65F | 1.18F | 2.36F | 4.15F |

| −92.30F | 2.03F | 1.38F |
|---|---|---|

EXAMPLE 2

| Element | Surface | Radius of Curvature | Axial Thickness/ Separation | Refractive Index Nd | Constringence V |
|---|---|---|---|---|---|
| I | R1 | 116.52 | | | |
| | | | 14.48 | 1.6204 | 60.3 |
| | R2 | −257.83 | | | |
| | | | 15.16 | | |
| | R3 | −57.25 | | | |
| II | | | 4.99 | 1.6535 | 33.5 |
| | R4 | −271.63 | | | |
| | | | 0.25 | | |
| | R5 | 95.59 | | | |
| III | | | 3.77 | 1.7484 | 27.7 |
| | R6 | 47.47 | | | |
| IV | | | 31.29 | 1.6204 | 60.3 |
| | R7 | −112.93 | | | |
| | | | 0.25 | | |
| | R8 | 157.72 | | | |
| V | | | 14.67 | 1.7440 | 44.8 |
| | R9 | −181.09 | | | |
| | | | 0.20 | | |
| | R10 | 42.15 | | | |
| VI | | | 16.68 | 1.8503 | 32.2 |
| | R11 | 45.69 | | | |
| | | | 9.90 | | |
| | R12 | PLANO | | | |
| P | | | 3.49 | 1.6204 | 60.3 |
| | R13 | PLANO | | | |

EFL 49.37  F/0.61  60 Degrees Field of View

FOCAL LENGTH RATIOS:

| I | II | III | IV | V | VI |
|---|---|---|---|---|---|
| 2.67F | −2.28F | −2.65F | 1.18F | 2.35F | 4.11F |

| 225.07F | 2.03F | 1.37F |
|---|---|---|

EXAMPLE 3

| Element | Surface | Radius of Curvature | Axial Thickness/ Separation | Refractive Index Nd | Constringence V |
|---|---|---|---|---|---|
| I | R1 | 117.24 | | | |
|   |    |        | 14.57 | 1.6204 | 60.3 |
|   | R2 | −259.42 | | | |
|   |    |        | 16.36 | | |
| II | R3 | −57.40 | | | |
|   |    |       | 5.06 | 1.6535 | 33.5 |
|   | R4 | −259.42 | | | |
|   |    |        | 0.20 | | |
| III | R5 | 96.17 | | | |
|   |    |      | 3.80 | 1.7484 | 27.7 |
|   | R6 | 49.25 | | | |
| IV |    |       | 32.15 | 1.6204 | 60.3 |
|   | R7 | −113.62 | | | |
|   |    |        | 0.20 | | |
|   | R8 | 143.47 | | | |
| V |    |       | 13.42 | 1.7440 | 44.8 |
|   | R9 | −205.96 | | | |
|   |    |        | 0.20 | | |
|   | R10 | 41.94 | | | |
| VI |    |      | 16.79 | 1.8503 | 32.2 |
|   | R11 | 45.44 | | | |
|   |    |       | 9.72 | | |
|   | R12 | PLANO | | | |
| P |    |        | 3.49 | 1.6204 | 60.3 |
|   | R13 | PLANO | | | |

EFL 49.37    F/0.61    60 Degrees Field of View

FOCAL LENGTH RATIOS:

| I | II | III | IV | V | VI |
|---|---|---|---|---|---|
| 2.68F | −2.31F | −2.83F | 1.21F | 2.34F | 4.05F |
| 85.09F |  | 2.02F |  | 1.36F |  |

EXAMPLE 4

| Element | Surface | Radius of Curvature | Axial Thickness/ Separation | Refractive Index Nd | Constringence V |
|---|---|---|---|---|---|
| I | R1 | 90.02 | | | |
|   |    |       | 12.93 | 1.6204 | 60.3 |
|   | R2 | −340.77 | | | |
|   |    |        | 16.26 | | |
| II | R3 | −58.49 | | | |
|   |    |       | 5.97 | 1.6535 | 33.5 |
|   | R4 | −173.60 | | | |
|   |    |        | 0.25 | | |
| III | R5 | 106.50 | | | |
|   |    |       | 4.20 | 1.7484 | 27.7 |
|   | R6 | 54.54 | | | |
| IV |    |       | 30.95 | 1.6204 | 60.3 |
|   | R7 | −125.82 | | | |
|   |    |        | 0.25 | | |
|   | R8 | 137.73 | | | |
| V |    |       | 12.28 | 1.7440 | 44.8 |
|   | R9 | −197.73 | | | |
|   |    |        | 0.19 | | |
|   | R10 | 43.77 | | | |
| VI |    |      | 14.74 | 1.8503 | 32.2 |
|   | R11 | 49.13 | | | |
|   | R12 | | | | |
| P |    | NOT PRESENT | − | − | − |
|   | R13 | | | | |

EFL 49.37    F/0.61    60 Degrees Field of View

FOCAL LENGTH RATIOS:

| I | II | III | IV | V | VI |
|---|---|---|---|---|---|
| 2.35F | −2.79F | −3.13F | 1.33F | 2.24F | 4.22F |
| 7.63F |  | 2.22F |  | 1.36F |  |

EXAMPLE 5

| Element | Surface | Radius of Cruvature | Axial Thickness/ Separation | Refractive Index Nd | Constringence V |
|---|---|---|---|---|---|
| I | R1 | 126.80 | | | |
|   |    |       | 15.55 | 1.6204 | 60.3 |
|   | R2 | −413.25 | | | |
|   |    |        | 17.46 | | |
| II | R3 | −50.82 | | | |
|   |    |       | 5.40 | 1.6535 | 33.5 |
|   | R4 | −73.18 | | | |
|   |    |        | 0.22 | | |
| III | R5 | 77.10 | | | |
|   |    |       | 4.05 | 1.7484 | 27.7 |
|   | R6 | 39.05 | | | |
| IV |    |       | 34.31 | 1.6204 | 60.3 |
|   | R7 | −144.89 | | | |
|   |    |        | 0.25 | | |
|   | R8 | 124.91 | | | |
| V |    |       | 11.60 | 1.7440 | 44.8 |
|   | R9 | −178.11 | | | |
|   |    |        | 0.25 | | |
|   | R10 | 54.77 | | | |
| VI |    |      | 13.99 | 1.8503 | 32.2 |
|   | R11 | 48.99 | | | |
|   | R12 | | | | |
| P |    | NOT PRESENT | − | − | − |
|   | R13 | | | | |

EFL 50.0    F/.0.61    59 Degrees Field of View

FOCAL LENGTH RATIOS:

| I | II | III | IV | V | VI |
|---|---|---|---|---|---|
| 3.16F | −5.63F | | | 2.01F | 98.67F |
| 6.36F |  | 1.98F |  | 1.74F |  |

EXAMPLE 6

| Element | Surface | Radius of Curvature | Axial Thickness/ Separation | Refractive Index Nd | Constringence V |
|---|---|---|---|---|---|
| I | R1 | 135.48 | | | |
|   |    |       | 14.93 | 1.6204 | 60.3 |
|   | R2 | −249.68 | | | |
|   |    |        | 16.77 | | |
| II | R3 | −55.20 | | | |
|   |    |       | 5.19 | 1.6535 | 33.5 |
|   | R4 | −138.59 | | | |
|   |    |        | 0.21 | | |
| III | R5 | 82.27 | | | |
|   |    |       | 3.89 | 1.7484 | 27.7 |
|   | R6 | 56.22 | | | |
| IV |    |       | 32.95 | 1.6204 | 60.3 |
|   | R7 | −110.00 | | | |
|   |    |        | 0.21 | | |
|   | R8 | 174.48 | | | |
| V |    |       | 13.75 | 1.7440 | 44.8 |
|   | R9 | −1076.56 | | | |
|   |    |        | 0.21 | 1.8503 | |
|   | R10 | 41.82 | | | |
| VI |    |      | 17.21 | | 32.2 |
|   | R11 | 46.57 | | | |
|   | R12 | | | | |
| P |    | NOT PRESENT | − | − | − |
|   | R13 | | | | |

EFL 50.8    F/0.65    59 Degrees Field of View

FOCAL LENGTH RATIOS:

| I | II | III | IV | V | VI |
|---|---|---|---|---|---|
| 2.84F | −2.84F | | | 4.01F | 3.58F |
| 19.52F |  | 1.70F |  | 1.78F |  |

EXAMPLE 7

| Element | Surface | Radius of Curvature | Axial Thickness/ Separation | Refractive Index Nd | Constringence V |
|---|---|---|---|---|---|
| I | R1 | 79.84 | | | |
| | | | 14.44 | 1.6204 | 60.3 |
| | R2 | −579.12 | | | |
| | | | 16.22 | | |
| | R3 | −75.23 | | | |
| II | | | 5.02 | 1.6535 | 33.5 |
| | R4 | −198.64 | | | |
| | | | 0.20 | | |
| | R5 | 201.84 | | | |
| III | | | 3.76 | 1.7484 | 27.7 |
| | R6 | 54.38 | | | |
| IV | | | 31.87 | 1.6204 | 60.3 |
| | R7 | −165.33 | | | |
| | | | 0.20 | | |
| | R8 | 77.04 | | | |
| V | | | 16.64 | 1.7440 | 44.8 |
| | R9 | −1631.34 | | | |
| | | | 0.20 | | |
| | R10 | 46.72 | | | |
| VI | | | 16.65 | 1.8503 | 32.2 |
| | R11 | 58.26 | | | |
| | R12 | | | | |
| P | | NOT PRESENT | — | — | — |
| | R13 | | | | |

EFL 51.0    F/0.61    51 Degrees Field of View

FOCAL LENGTH RATIOS:
| I | II | III | IV | V | VI |
|---|---|---|---|---|---|
| 2.25F | −3.71F | | | 1.95F | 3.28F |
| 4.38F | | 3.94F | | 1.17F | |

EXAMPLE 8

| Element | Surface | Radius of Curvature | Axial Thickness/ Separation | Refractive Index Nd | Constringence V |
|---|---|---|---|---|---|
| I | R1 | 87.78 | | | |
| | | | 14.53 | 1.6204 | 60.3 |
| | R2 | 335.45 | | | |
| | | | 23.24 | | |
| | R3 | −62.81 | | | |
| II | | | 8.72 | 1.6535 | 33.5 |
| | R4 | −79.07 | | | |
| | | | 0.24 | | |
| | R5 | 97.60 | | | |
| III | | | 4.47 | 1.7484 | 27.7 |
| | R6 | 58.10 | | | |
| IV | | | 37.77 | 1.6204 | 60.3 |
| | R7 | −158.03 | | | |
| | | | 0.30 | | |
| | R8 | 229.64 | | | |
| V | | | 15.72 | 1.7440 | 44.8 |
| | R9 | −259.86 | | | |
| | | | 0.24 | | |
| | R10 | 61.24 | | | |
| VI | | | 16.72 | 1.8503 | 32.2 |
| | R1 | 60.92 | | | |
| | R12 | | | | |
| P | | NOT PRESENT | — | — | — |
| | R13 | | | | |

EFL 60.0    F/0.7    50 Degrees Field of View

FOCAL LENGTH RATIOS:
| I | II | III | IV | V | VI |
|---|---|---|---|---|---|
| 3.15F | −9.97F | | | 2.79F | 10.01F |
| 4.50F | | 1.90F | | 2.0F | |

EXAMPLE 9

| Element | Surface | Radius of Curvature | Axial Thickness/ Separation | Refractive Index Nd | Constringence V |
|---|---|---|---|---|---|
| I | R1 | 91.68 | | | |
| | | | 16.21 | 1.7440 | 44.8 |
| | R2 | −180.40 | | | |
| | | | 10.81 | | |
| | R3 | −62.92 | | | |
| II | | | 5.40 | 1.6535 | 33.5 |
| | R4 | −284.39 | | | |
| | | | 0.22 | | |
| | R5 | 101.43 | | | |
| III | | | 4.16 | 1.7484 | 27.7 |
| | R6 | 53.99 | | | |
| IV | | | 24.31 | 1.6204 | 60.3 |
| | R7 | −124.56 | | | |
| | | | 0.22 | | |
| | R8 | 99.41 | | | |
| V | | | 10.81 | 1.7440 | 44.8 |
| | R9 | −1375.00 | | | |
| | | | 0.22 | | |
| | R10 | 54.03 | | | |
| VI | | | 11.92 | 1.8503 | 32.2 |
| | R11 | 65.30 | | | |
| | R12 | | | | |
| P | | NOT PRESENT | — | — | — |
| | R13 | | | | |

EFL 48.0    F/0.61    60 Degrees Field of View

FOCAL LENGTH RATIOS:
| I | II | III | IV | V | VI |
|---|---|---|---|---|---|
| 1.76F | −2.62F | | | 2.62F | 5.20F |
| 3.84F | | 2.19F | | 1.68F | |

EXAMPLE 10

| Element | Surface | Radius of Curvature | Axial Thickness/ Separation | Refractive Index Nd | Constringence V |
|---|---|---|---|---|---|
| I | R1 | 225.81 | | | |
| | | | 17.66 | 1.6204 | 60.3 |
| | R2 | −598.39 | | | |
| | | | 19.83 | | |
| | R3 | −69.58 | | | |
| II | | | 6.14 | 1.6535 | 33.5 |
| | R4 | −314.44 | | | |
| | | | 0.25 | | |
| | R5 | 108.80 | | | |
| III | | | 4.60 | 1.7484 | 27.7 |
| | R6 | 59.70 | | | |
| IV | | | 38.97 | 1.6204 | 60.3 |
| | R7 | −137.72 | | | |
| | | | 0.25 | | |
| | R8 | 173.91 | | | |
| V | | | 16.26 | 1.7440 | 44.8 |
| | R9 | −249.65 | | | |
| | | | 0.25 | | |
| | R10 | 50.84 | | | |
| VI | | | 20.36 | 1.8503 | 32.3 |
| | R11 | 55.08 | | | |
| | | | 11.78 | | |
| | R12 | PLANO | | | |
| P | | | 4.23 | 1.6204 | 60.3 |
| | R13 | PLANO | | | |

EFL 60.0    F/0.8    49 Degrees Field of View

FOCAL LENGTH RATIOS:
| I | II | III | IV | V | VI |
|---|---|---|---|---|---|
| 4.45F | −2.31F | | | 2.34F | 4.05F |
| −6.05F | | 1.93F | | 1.36F | |

EXAMPLE 11

| Element | Surface | Radius of Curvature | Axial Thickness/ Separation | Refractive Index Nd | Constringence V |
|---|---|---|---|---|---|
| I | R1 | 115.61 | | | |
|  |  |  | 14.88 | 1.6204 | 60.3 |
|  | R2 | −264.87 | | | |
|  |  |  | 16.71 | | |
| II | R3 | −57.28 | | | |
|  |  |  | 5.17 | 1.6535 | 33.5 |
|  | R4 | −672.07 | | | |
|  |  |  | 0.25 | | |
| III | R5 | 94.63 | | | |
|  |  |  | 3.74 | 1.7484 | 27.7 |
|  | R6 | 48.46 | | | |
| IV |  |  | 31.63 | 1.6204 | 60.3 |
|  | R7 | −111.80 | | | |
|  |  |  | 0.20 | | |
|  | R8 | 141.17 | | | |
| V |  |  | 13.20 | 1.7440 | 44.8 |
|  | R9 | −202.65 | | | |
|  |  |  | 0.20 | | |
|  | R10 | 41.27 | | | |
| VI |  |  | 16.52 | 1.8503 | 32.2 |
|  | R11 | 44.71 | | | |
|  |  |  | 9.83 | | |
|  | R12 | PLANO | | | |
| P |  |  | 3.56 | 1.6204 | 60.3 |
|  | R13 | PLANO | | | |

EFL 50.8    F/0.61    58 Degrees Field of View

FOCAL LENGTH RATIOS:
| I | II | III | IV | V | VI |
|---|---|---|---|---|---|
| 2.61F | −1.91F | | | 2.26F | 3.90F |
| | −19.85F | 1.95F | | 1.31F | |

It will be noted that in Example 8 above the element I is made meniscus, convex towards the front, instead of bi-convex. It will further be noted that no window or glass plate P was included in Examples 4 to 9.

As mentioned previously, the doublet formed by elements III and IV and providing the middle part of the lens can effectively be reversed so that the element III is a positive bi-convex element of crown glass disposed in front of and cemented to a negative element, which may be meniscus concave towards the front, or bi-concave, of flint glass. FIG. 2 illustrates such an embodiment with the positive element III bi-convex and the negative element IV bi-concave. In FIG. 2 the front positive element I is meniscus convex towards the front.

As also mentioned previously, the middle part of the lens can be a singlet positive element, i.e. the elements III and IV can effectively be combined into a single element. FIG. 3 illustrates such an embodiment with a single bi-convex element III/IV.

An example of lens in accordance with the FIG. 2 embodiment is given below as Example 12, and an example in accordance with the FIG. 3 embodiment as Example 13 (no surface R6 appearing in Example 13 since such surface is omitted). No plate or window P was included in Examples 12 and 13.

EXAMPLE 12

| Element | Surface | Radius of Curvature | Axial Thickness/ Separation | Refractive Index Nd | Constringence V |
|---|---|---|---|---|---|
| I | R1 | 85.45 | | | |
|  |  |  | 16.39 | 1.7440 | 44.8 |
|  | R2 | 555.41 | | | |
|  |  |  | 11.11 | | |
| II | R3 | −89.01 | | | |
|  |  |  | 5.70 | 1.6535 | 33.5 |
|  | R4 | −91.05 | | | |
|  |  |  | 0.28 | | |
| III | R5 | 81.68 | | | |
|  |  |  | 22.22 | 1.6204 | 60.3 |
|  | R6 | −79.34 | | | |
| IV |  |  | 8.87 | 1.7484 | 27.7 |
|  | R7 | 712.06 | | | |
|  |  |  | 0.31 | | |
|  | R8 | 123.42 | | | |
| V |  |  | 11.83 | 1.7440 | 44.8 |
|  | R9 | 694.26 | | | |
|  |  |  | 0.31 | | |
|  | R10 | 66.92 | | | |
| VI |  |  | 15.55 | 1.8503 | 32.2 |
|  | R11 | 84.15 | | | |
|  | R12 | | | | |
| P |  | NOT PRESENT | — | — | — |
|  | R13 | | | | |

EFL 55.9    F/0.7    50 Degrees Field of View

FOCAL LENGTH RATIOS:
| I | II | III | IV | V | VI |
|---|---|---|---|---|---|
| 2.41F | 1072.34F | | | 3.60F | 4.89F |
| | 2.46F | 3.44F | | 2.01F | |

EXAMPLE 13

| Element | Surface | Radius of Curvature | Axial Thickness/ Separation | Refractive Index Nd | Constringence V |
|---|---|---|---|---|---|
| I | R1 | 93.65 | | | |
|  |  |  | 14.38 | 1.6204 | 60.3 |
|  | R2 | −567.84 | | | |
|  |  |  | 16.15 | | |
| II | R3 | −53.87 | | | |
|  |  |  | 5.00 | 1.6535 | 33.5 |
|  | R4 | −109.09 | | | |
|  |  |  | 0.20 | | |
|  | R5 | 125.43 | | | |
| III/IV |  |  | 31.72 | 1.7440 | 44.8 |
|  | R7 | −132.20 | | | |
|  |  |  | 0.43 | | |
|  | R8 | 440.07 | | | |
| V |  |  | 12.64 | 1.7440 | 44.8 |
|  | R9 | −208.91 | | | |
|  |  |  | 0.71 | | |
|  | R10 | 39.79 | | | |
| VI |  |  | 16.82 | 1.8503 | 32.2 |
|  | R11 | 45.50 | | | |
|  | R12 | | | | |
| P |  | NOT PRESENT | — | — | — |
|  | R13 | | | | |

EFL 48.0    F/0.61    59 Degrees Field of View

FOCAL LENGTH RATIOS:
| I | II | III | IV | V | VI |
|---|---|---|---|---|---|
| 2.72F | −3.52F | | | 4.00F | 3.30F |
| | 7.79F | 1.90F | | 1.69F | |

It will be appreciated that since the focal length of the front part of the lens (elements I and II) can be negative (as illustrated by Examples 1, 10 and 11) or positive (as illustrated by the other examples), i.e. the front part as a whole may be diverging or converging, the front part could also be made neutral (i.e. effectively have infinite focal length). It will also be seen, particularly from Example 12, that the negative element II in the front part can have a very long focal length effectively approaching infinity.

It will further be appreciated that all the lens elements in the above described examples have spherical curvatures and avoid any recourse to complex and expensive aspheric surfaces.

It will also be appreciated that if a bend in the light path through the lens is required, a prism may be inserted in the lens between the middle and rear parts (i.e. between the elements IV and V when suitably spaced) and the lens re-optimised accordingly.

In all the above described examples the quoted F/Number is at the object plane, which may be occupied by the screen of a cathode ray or image intensifier tube. It will be appreciated that, although as described above a low field curvature can be achieved by lenses in accordance with the invention, if desired a curved fibre-optic face plate may be used in conjunction with such a lens effectively to accommodate any residual field curvature.

We claim:

1. A biocular magnifying lens faster than F/1.0 having a front part which in use faces towards the eyes, a middle part, and a back part which in use faces towards the object, the front part comprising at least two elements including a positive element disposed in front of and spaced from a singlet element having a negative focal length which has a concave front surface, the middle part being convergent, and the back part being convergent and comprising at least two elements including a positive element disposed in front of a rear positive element, said rear positive element being meniscus in shape convex towards the front and having a divergent rear surface.

2. A lens according to claim 1 wherein the front part of the lens consists of a positive element disposed in front of a singlet meniscus element concave towards the front and having a focal length from −1.9F to minus infinity, where F is the focal length of the complete lens.

3. A lens according to claim 1 wherein the middle part of the lens consists of a single positive element.

4. A lens according to claim 1 wherein the middle part of the lens consists of a positive element and a negative element formed into a cemented doublet.

5. A lens according to claim 1 wherein the front part of the lens has a focal length in the range 2.5F through infinity to −6F, the middle part of the lens has a focal length in the range 1.7F to 4.0F, and the back part of the lens has a focal length in the range 1.1F to 2.0F, where F is the focal length of the complete lens.

6. A lens according to claim 5 wherein the front part of the lens consists of a positive element having a focal length in the range 1.75F to 4.5F disposed in front of a singlet element having a focal length in the range −1.9F to infinity.

7. A lens according to claim 5 wherein the back part of the lens consists of a positive element having a focal length in the range 2.0F to 4.0F disposed in front of a positive meniscus element having a focal length in the range 3.3F to 100F.

8. A lens according to claim 1 wherein said divergent rear surface of said rear positive element has a radius of curvature in the range 0.83F to 1.5F where F is the focal length of the complete lens.

9. A lens according to claim 8 wherein the ratio of the radius of curvature of the front surface of said rear positive element to that of said divergent rear surface is in the range 0.5 to 1.4.

10. A biocular magnifying lens faster than F/1.0 consisting of from front to back a first element which is positive and has a convex front surface, a second element which is a singlet element having a negative focal length and which is meniscus concave towards the front, a third element which is positive and has a convex front surface, a fourth element which is positive and has a convex front surface, and a fifth element which is positive and meniscus convex towards the front, the front of the lens in use facing towards the eyes and the back facing towards the object.

11. A lens according to claim 10 wherein said singlet element has a focal length from −1.9F to minus infinity, where F is the focal length of the complete lens.

12. A biocular mgnifying lens faster than F/1.0 consisting of from front to back a first element which is positive and has a convex front surface, a second element which is a singlet element having a negative focal length and which is meniscus concave towards the front, a third element and a fourth element which together form a doublet which is positive and has a front convex surface, one of said third and fourth elements being positive and the other negative, a fifth element which is positive and has a convex front surface, and a sixth element which is positive and meniscus convex towards the front, the front of the lens in use facing towards the eyes and the back facing towards the object.

13. A lens according to claim 12 wherein said third element is a meniscus element which is negative and has a convex front surface, and said fourth element is a bi-convex element which is positive.

14. A lens according to claim 12 wherein said third element is a bi-convex element which is positive, and said fourth element is negative and has a concave front surface.

15. A lens according to claim 12 wherein said singlet element has a focal length from −1.9F to minus infinity, where F is the focal length of the complete lens.

* * * * *

UNITED STATES PATENT AND TRADEMARK OFFICE
CERTIFICATE OF CORRECTION

PATENT NO. : 4,183,624

DATED : January 15, 1980

INVENTOR(S) : Philip J. Rogers, Michael Roberts

It is certified that error appears in the above-identified patent and that said Letters Patent are hereby corrected as shown below:

Col. 6, line 6, delete "Cruvature" and substitute therefor --Curvature--.

Col. 6, line 28, delete "F/.0.61" and substitute therefor --F/0.61--.

Signed and Sealed this

Twenty-seventh Day of November 1984

[SEAL]

Attest:

Attesting Officer

GERALD J. MOSSINGHOFF

Commissioner of Patents and Trademarks